United States Patent [19]
Golshani et al.

[11] Patent Number: 5,774,128
[45] Date of Patent: Jun. 30, 1998

[54] METHOD OF GRAPHICALLY DISPLAYING AN OBJECT-ORIENTED SCHEMA

[75] Inventors: Forouzan Golshani, Paradise Valley; Oris D. Friesen; Thomas H. Howell, both of Scottsdale, all of Ariz.

[73] Assignee: Bull HN Information Systems, Inc., Billerica, Mass.

[21] Appl. No.: 624,725

[22] Filed: Mar. 26, 1996

[51] Int. Cl.$^6$ .................................................. G06T 11/00
[52] U.S. Cl. ............................................................. 345/440
[58] Field of Search .................................. 395/133–140, 395/335; 345/430–440, 335

[56] References Cited

U.S. PATENT DOCUMENTS

| | | | |
|---|---|---|---|
| 5,625,767 | 4/1997 | Bartell et al. | 395/140 |
| 5,627,979 | 5/1997 | Chang et al. | 395/335 |

*Primary Examiner*—Almis R. Jankus
*Attorney, Agent, or Firm*—J. S. Solakian; E. W. Hughes

[57] ABSTRACT

A method for graphically displaying an object-oriented schema on the screen of a computer system. The input is an object-oriented schema of a database in textual form. The input is parsed to identify the components of the schema. A connectivity matrix is developed in order to determine the number of interrelationships of objects. The screen is partitioned into cells, with each cell designed to hold an object and its attributes, with the object that has the maximum number of relationships with other objects being placed in the center cell of the grid, and related objects in adjacent (surrounding) cells. Relationships between objects and their attributes are identified by lines, arcs, labels, and arrows drawn on the screens of the display device of the computer system. The user can interface with the system by clicking on the graphical objects appearing on the computer screen.

3 Claims, 5 Drawing Sheets

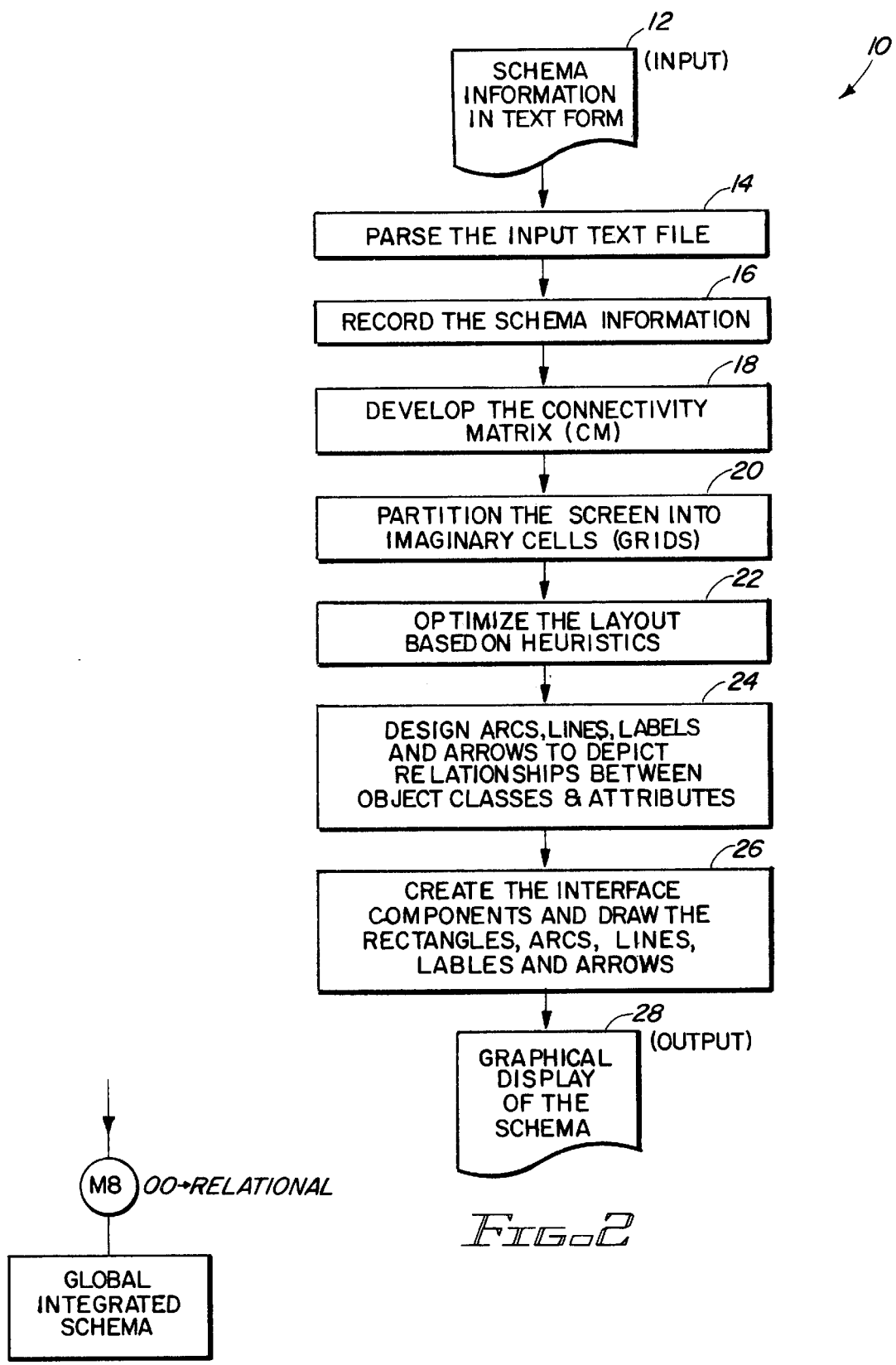

|  | COURSE | STUDENT | FACULTY | DEPT. | COLLEGE | TOTAL NUMBER OF CONNECTIONS |
|---|---|---|---|---|---|---|
| COURSE |  | 1 | 1 | 0 | 0 | 2 |
| STUDENT | 1 |  | 1 | 1 | 0 | 3 |
| FACULTY | 1 | 1 |  | 1 | 1 | 4 |
| DEPT. | 0 | 1 | 1 |  | 1 | 3 |
| COLLEGE | 0 | 0 | 1 | 1 |  | 2 |

METHOD OF GRAPHICALLY DISPLAYING AN OBJECT-ORIENTED SCHEMA

CROSS-REFERENCE TO RELATED APPLICATIONS

U.S. patent application of Forouzan Golshani, et al entitled Method of Integrating Schemas of Distributed Heterogeneous Databases; and U.S. patent application of Forouzan Golshani, et al entitled Method for Converting a Database Schema in Relational form to a Schema in Object-Oriented Form, filed concurrently herewith which applications are assigned to the assignee of the present invention.

BACKGROUND OF THE INVENTION (1) Field of the Invention

This invention relates to distributed database management systems and more particularly to a method of creating a graphical display of database schemas for the purpose of providing a visual interface for the process of schema integration. With a graphical display, users of the schema integration tool can interact with a visual interface that operates on the graphical displays of database schemas.

(2) Background of the Invention

Many enterprises have accumulated throughout the years, either by expansion or by acquisition, a number of database management systems (DBMS)s. These systems are generally heterogeneous in that they differ from one another with respect to platform or computer system in which they reside, data model, language for implementation, languages for querying and updating, schema, and data types. With the trend toward interoperability in enterprises, it has become more and more necessary for the existing database management systems to cooperate and to exchange data. Without a software tool, or method, for schema integration, a user must either manually retrieve the local schemas of other database systems of interest or guess what may be available on other desired database systems which reside at a remote site. Without a global (integrated) schema, any query involving retrieval from more than one database system must be broken down manually, and partial answers received from the participating database systems must be merged by the user. For a description of a method for schema integration, reference is made to the above identified cross-referenced patent application which is incorporated herein by reference and made a part hereof.

Schema Integration is the integration of a plurality of existing schemas into a single logical schema. The object is to provide a new and coherent view of the components of multiple database management systems. Usually these database management systems are heterogeneous and originally were not designed to be interoperable.

Although schema integration may be done via non-graphical methods, i.e., the traditional way requires a user to write specific code, a visual interface, on the other hand, provides the user with a graphical presentation of the schemas that will enable the user to "point" and "click" at the appropriate objects in order to specify the desired operations.

While graphical display of schemas is particularly useful in the process of integrating schemas of heterogeneous databases, this method has utility in such other areas as: query formulation, by which the user can specify the desired query by clicking on the appropriate objects; schema modification, where the user makes changes to the schema through the visual interface; and schema browsing for the purpose of examining the logical contents of the database.

SUMMARY OF THE INVENTION

The present invention is a software tool, or method, by which a computer system, given a schema in object oriented form, generates a graphical display in which each object and its associated attributes are responsive to certain operations that enable the user to manipulate the contents of the schema graphically. In the schema integration process, once a schema is displayed graphically, the user can then work with the graphical display instead of writing computer commands.

BRIEF DESCRIPTION OF THE DRAWING

Other objects, features and advantages of the invention will be readily apparent from the following description of a preferred embodiment thereof although variations and modifications may be effected without departing from the spirit and scope of the novel concepts of the disclosure, and in which:

FIGS. 1a and 1b are a data flow diagram of the components and software modules of the schema integration tool;

FIG. 2 is a flow chart of the steps of the process for generating a graphical display of an object-oriented schema in text form;

DESCRIPTION OF THE PREFERRED EMBODIMENT

Figure 1A:
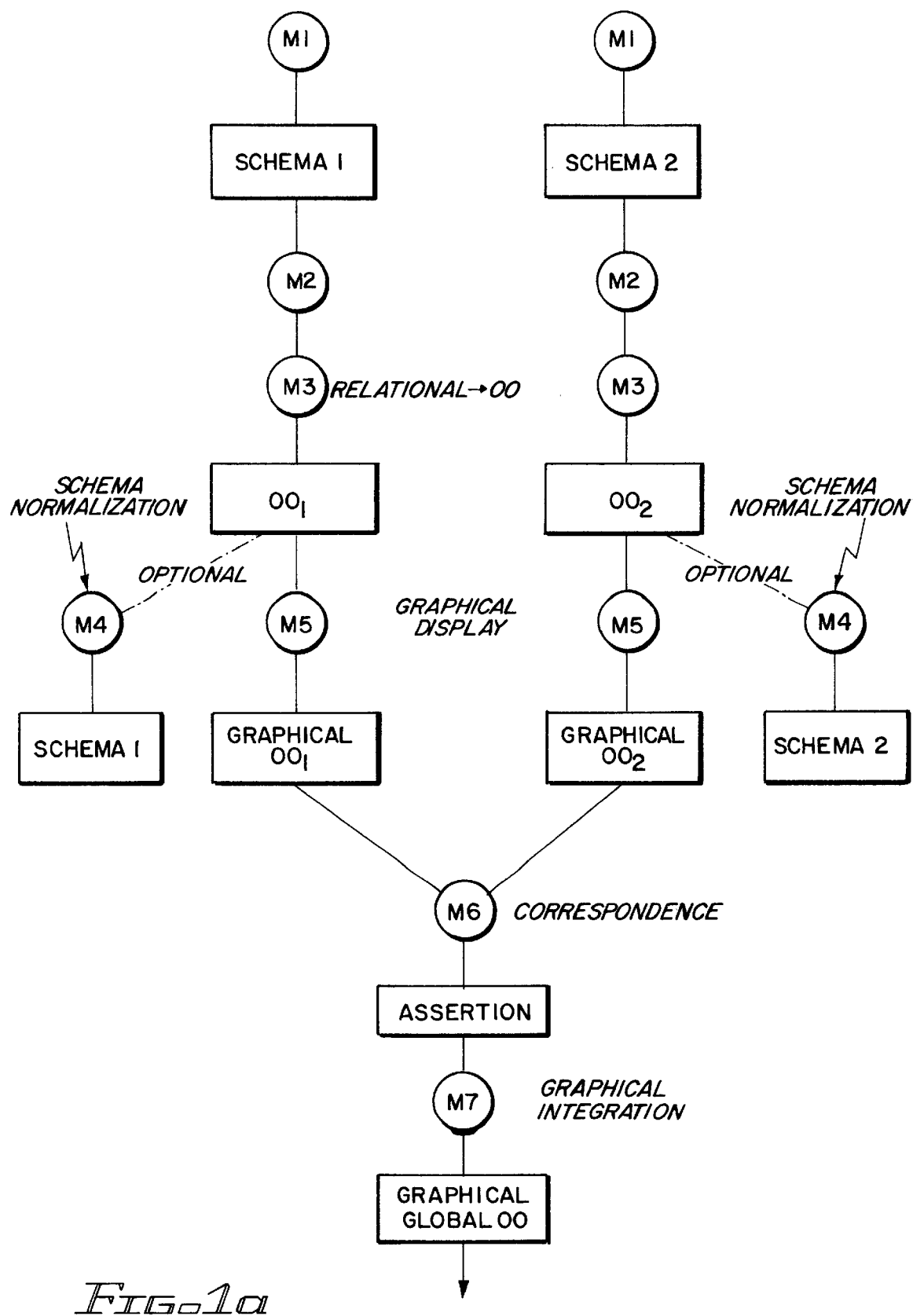

FIGS. 1a and 1b illustrate the flow of information among the modules of the cross-referenced patent application for a method of integrating schemas. In FIG. 1a and 1b circles represent software modules of the integration tool and rectangles represent objects created by said modules. The function of software module M5 of FIG. 1a, the subject of this invention, is to produce a graphical display of an object oriented database schema in text form.

Figures 3, 4:
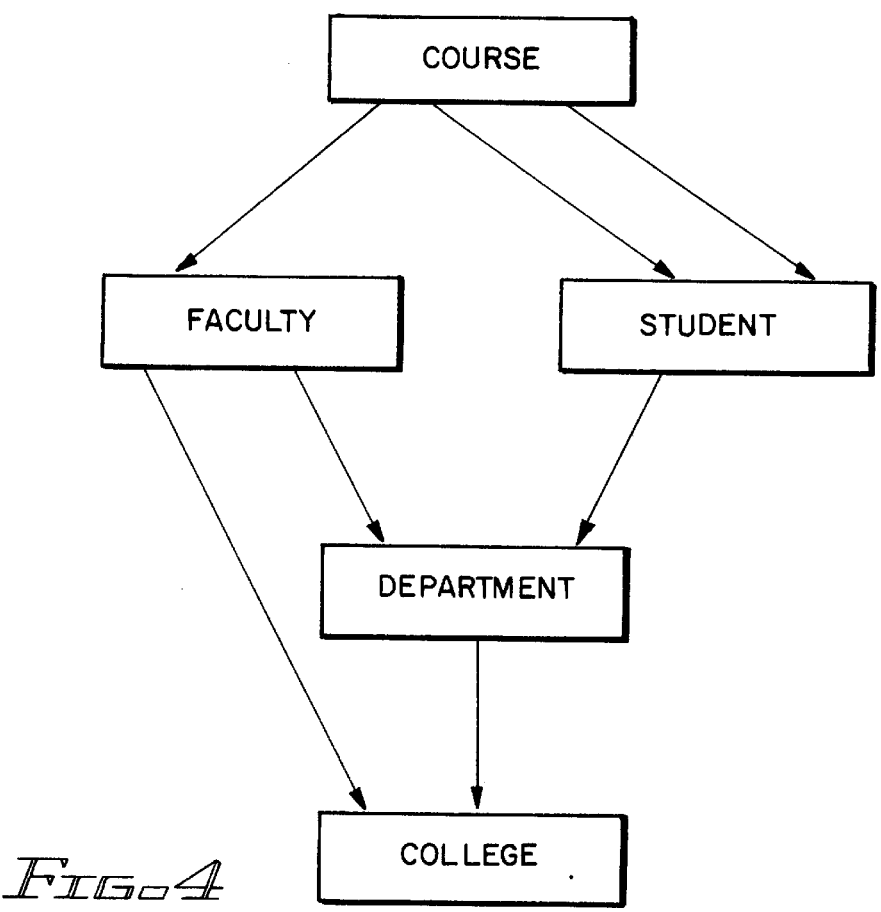
FIG. 3 is an example of a connectivity matrix of "n" objects.
FIG. 4 is a portion of a schema for a university.
Figures 5, 6:
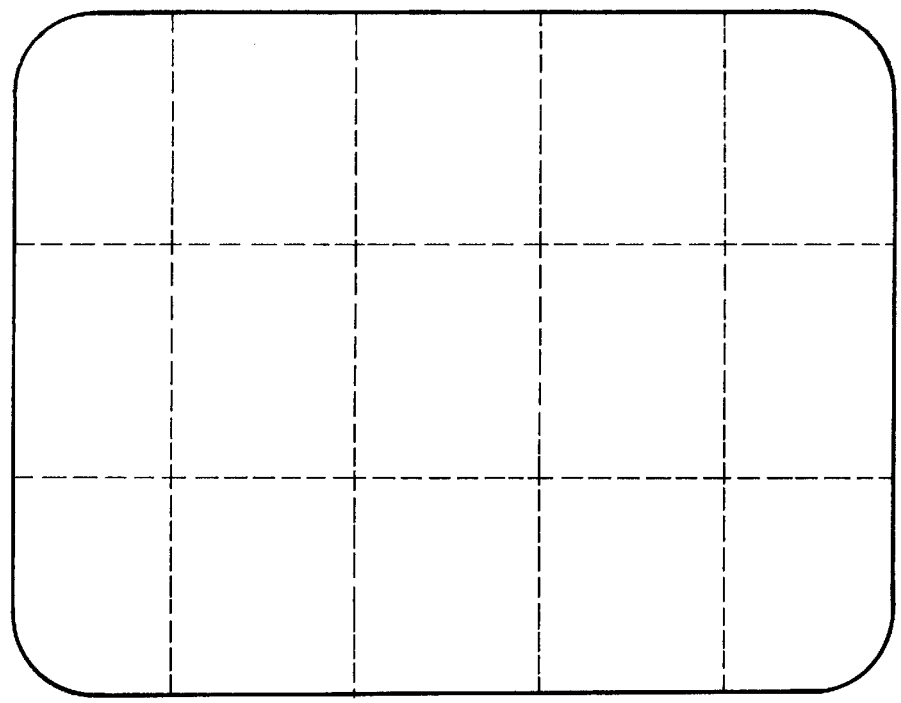
FIG. 5 is a connectivity matrix for the portion of a university schema illustrated in FIG. 4.
FIG. 6 is an example of a three by five grid.

In FIG. 2, the steps of the method, or software module, 10 are illustrated. The input 12 is an object-oriented schema of a database in textual form such as is produced by module M3, an example of which is illustrated in FIG. 6 of the cross-referenced patent application entitled Method for Converting a Database Schema in Relational Form to A schema in Object-Oriented Form which is incorporated herein by reference and made a part hereof. The textual information input is parsed, or analyzed, in block 14 to break it down into elemental components so that its various components can be recognized. These components are then recorded, block 16. A connectivity matrix (CM) such as is illustrated in FIG. 3 is-then created, block 18. FIG. 3 is a connectivity matrix for "n" objects. An entry of a 1 in common block identifies that a connection exists. An entry of a 0 indicates that no connection exists between the two identified objects. The CM provides information about the number of relationships between any given pair of objects.

FIG. 4 illustrates a portion of a university schema and FIG. 5 presents a connectivity matrix and the number of connections for each object in the extreme right hand column. In FIG. 5 the object Course is connected to two other objects, Student and Faculty so that the total number of connections is two. On the other hand, the object Faculty is connected to four other objects; namely, Course, Student, Department, and College.

Figure 7:
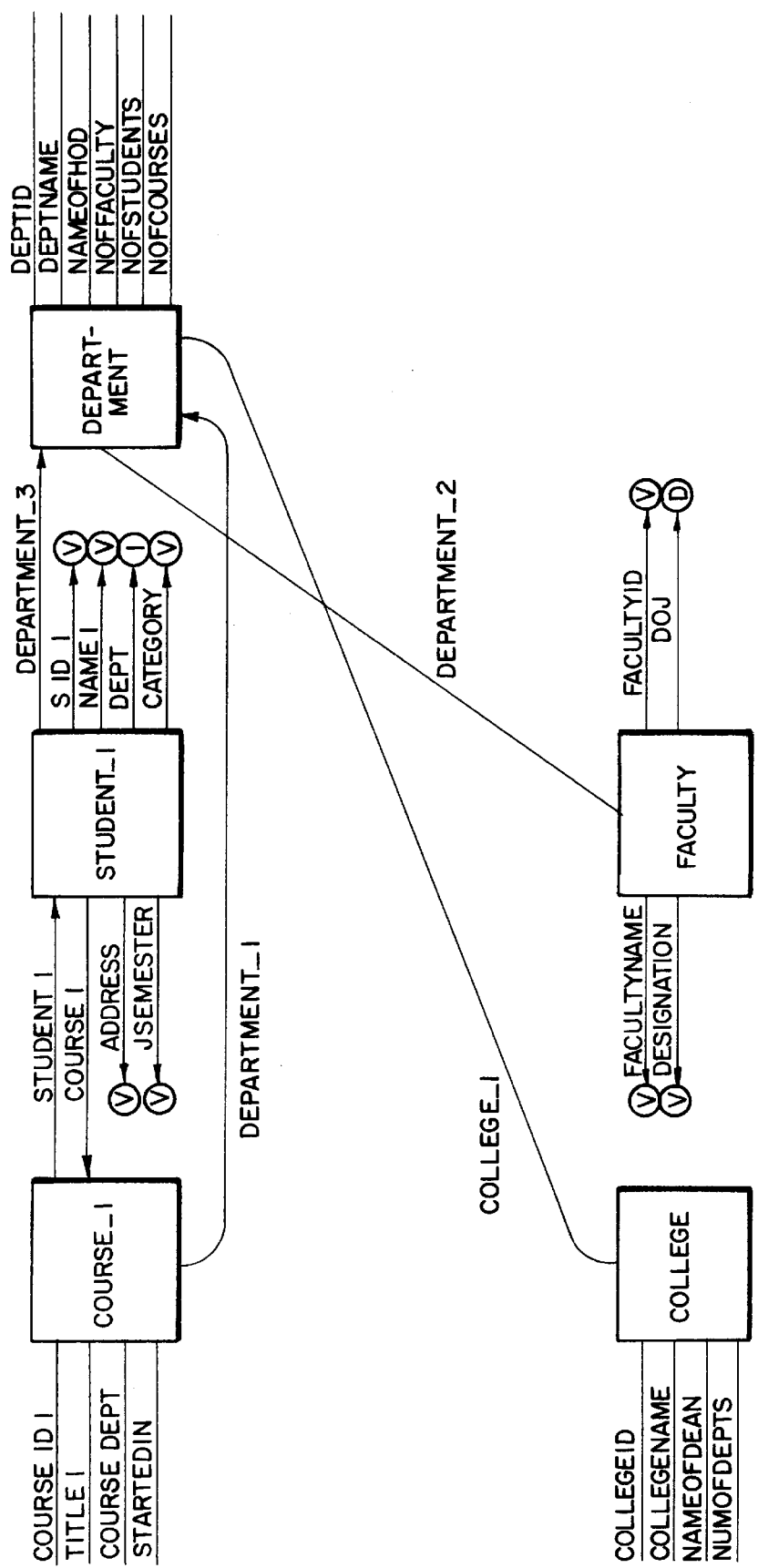
FIG. 7 is the output of the graphical display tool for the schema of a university database.

The screen of a CRT of a computer system is then partitioned into a grid of cells, step 20. The grid sizes are 9, 15 and 25 cells with FIG. 6 illustrating a grid of size 15. Each cell will hold an object and its attributes. The layout of each cell is optimized based on heuristics with each object class being assigned to a cell; such as placing the object that participates in the maximum number of relationships in the center cell, and placing related objects in adjacent cells as can be seen in FIG. 7. In step 24 arcs, lines, labels and arrows are designed to depict relationships between objects and their attributes, again as is illustrated in FIG. 7. In step 26 the interface components such as rectangles, arcs, lines, labels and arrows are drawn on the computer screen of the computer system, see FIG. 7. In step 28, the desired information is graphically displayed on the screen of the computer system which executes the program.

FIG. 7 is an example of the kind of output that the method of this invention generates. Each rectangle represents an object, single headed arrows represent the attributes of the objects, and the double headed arrows represent relationships.

By referring to the cross-referenced patent application of Forouzan Golshani, et al entitled Method of integrating Schemas of Distributed Heterogeneous Databases it can be seen that once two schemas are present on the screen graphically, the correspondence specification process can begin by which equivalencies between the two schemas can be specified.

What is claimed is:

1. A method residing in a computer system for graphically displaying a database schema in object-oriented (oo) form; comprising the steps of:

1, receiving as an input the textual description of an oo schema;

2, parsing the input to identify components of the oo schema;

3, creating a connectivity matrix (CM) which provides information as to the number of relationships between any given pair of objects, and partitioning the display screen of a computer into a grid of cells, one of said cells being a center cell, with each cell having the ability to hold an object and the attributes of that object, and placing the object that participates in the maximum number of relationships in the center cell of said grid and placing related objects in adjacent cells; and 4, depicting relationships between objects and their attributes by lines, arcs, labels, and arrows, on the computer screen.

2. The method of claim 1 in which the input to the oo schema is in text form.

3. The method of claim 2 in which the said grid of cells is partitioned into either 9, 15 or 25.

* * * * *